US007814240B2

(12) United States Patent
Salgado et al.

(10) Patent No.: US 7,814,240 B2
(45) Date of Patent: Oct. 12, 2010

(54) METHOD AND APPARATUS FOR A CONNECTION SENSING APPARATUS

(75) Inventors: David L Salgado, Victor, NY (US); Kimberly S Stankey, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/112,505

(22) Filed: Apr. 30, 2008

(65) Prior Publication Data

US 2008/0196519 A1 Aug. 21, 2008

Related U.S. Application Data

(62) Division of application No. 09/470,234, filed on Dec. 22, 1999, now Pat. No. 7,384,300.

(51) Int. Cl.
*G06F 3/00* (2006.01)

(52) U.S. Cl. .......................... 710/15; 710/16; 379/1.03; 439/489

(58) Field of Classification Search ....................... None
See application file for complete search history.

(56) References Cited

U.S. PATENT DOCUMENTS

| | | | | |
|---|---|---|---|---|
| 3,718,859 | A * | 2/1973 | Arlow | 324/72.5 |
| 4,224,485 | A | 9/1980 | Krumreich | |
| 4,367,907 | A * | 1/1983 | Buck | 439/188 |
| 4,699,443 | A | 10/1987 | Goodrich et al. | |
| 5,120,255 | A * | 6/1992 | Kouda et al. | 439/489 |
| 5,222,164 | A * | 6/1993 | Bass et al. | 385/14 |
| 5,599,209 | A | 2/1997 | Belopolsky | |
| 5,692,925 | A * | 12/1997 | Bogese, II | 439/620.04 |
| 5,790,640 | A * | 8/1998 | Tassa et al. | 379/100.15 |
| 5,841,851 | A | 11/1998 | Recht et al. | |
| 5,864,607 | A * | 1/1999 | Rosen et al. | 379/90.01 |
| 5,905,782 | A * | 5/1999 | Lee et al. | 379/100.01 |
| 5,938,480 | A * | 8/1999 | Aldous et al. | 439/676 |
| 6,056,568 | A | 5/2000 | Arnett | |
| 6,222,910 | B1 * | 4/2001 | Price et al. | 379/93.37 |
| 6,298,122 | B1 | 10/2001 | Horne | |
| 6,350,148 | B1 * | 2/2002 | Bartolutti et al. | 439/489 |
| 6,497,588 | B1 | 12/2002 | Scharf et al. | |
| 6,499,861 | B1 * | 12/2002 | German et al. | 362/253 |
| 6,697,464 | B1 * | 2/2004 | Nelson et al. | 379/93.05 |
| 6,755,681 | B2 * | 6/2004 | Chen | 439/489 |
| 6,842,114 | B2 * | 1/2005 | Billiard | 340/568.1 |

(Continued)

OTHER PUBLICATIONS

Salgado et al., U.S. Appl. No. 09/470,234, filed Dec. 22, 1999, "Method and Apparatus for a Connection Sensing Apparatus".

(Continued)

*Primary Examiner*—Henry W Tsai
*Assistant Examiner*—Michael Sun
(74) *Attorney, Agent, or Firm*—Fay Sharpe LLP

(57) ABSTRACT

An apparatus and method are provided for a plug connector sensing apparatus for determining whether a transmission line is present within a receptacle. A reprographic printing system including this apparatus is disclosed. The method of using this plug sensing apparatus comprises determining, with the plug connector sensor, whether the plug connector is present within the receptacle and determining, with a separate signal detector, whether a signal is being communicated through the transmission line.

29 Claims, 6 Drawing Sheets

U.S. PATENT DOCUMENTS

| | | | | |
|---|---|---|---|---|
| 6,885,478 | B1 | 4/2005 | Salgado et al. | |
| 2001/0054985 | A1 * | 12/2001 | Jones et al. | 343/906 |
| 2006/0234564 | A1 * | 10/2006 | Pharn et al. | 439/676 |
| 2007/0211885 | A1 * | 9/2007 | Ganadillo et al. | 379/412 |

OTHER PUBLICATIONS

The American Heritage Dictionary of the English Language, Third edition, Houghton Mifflin Company.

* cited by examiner

METHOD AND APPARATUS FOR A CONNECTION SENSING APPARATUS

CROSS-REFERENCE TO RELATED APPLICATIONS

This application is a divisional of U.S. application Ser. No. 09/470,234 filed on Dec. 22, 1999 by the same inventors, and claims priority therefrom, the disclosure of which is totally incorporated herein by reference.

BACKGROUND AND SUMMARY

The present invention relates generally to a device configured for remote communications through a transmission line and more particularly to printing apparatus configured for remote data transfer and diagnostics.

Many types of home, office and commercial electronic equipment now feature capabilities enabled through connection with remote sending and receiving devices. Among the most connections are computer connections with the Internet, facsimile connection with fiber or telephonic transmission lines, and networked office equipment connected through an Ethernet. For complex equipment such as electronic printers and copiers, an increasingly common feature is remote data transfer and diagnostics through which software can be remotely maintained and updated and, in the event of required machine maintenance, diagnostic communications can increase the likelihood that service personnel arrive on-site with the appropriate replacement parts and, at a minimum, arrive with advanced knowledge of the probable location within the system in need of repair. For instance, the DocuCentre 240/265 family of multifunctional printing systems sold by the Xerox Corporation features remote data transfer capability, including automatic detection on startup. Upon machine start-up, the machine runs a dial tone test to determine if the machine has remote data transfer (RDT) configured. If the test results contradict with the system's RDT settings, an error message is presented to the user stating this "configuration mismatch". The user then needs to specify whether RDT is configured or not.

An undesired effect of the above increased connectedness is an increasing number of fault messages delivered to operators informing them that the communications link is disabled or not available. One reason for this increase in fault messages is the trend toward placement of more and more devices on the same cable or phone line. Since most of these devices require only periodic communication with their remote data transfer host, placement of multiple devices on the same line is more economical than adding new cable or phone lines for each new device. Of course, the more devices that are placed on a single line, the greater the probability that the line will be in use by another device when the subject device seeks to detect a dial tone.

Under current practices, an operator working with a device that receives a fault message indicating the non-availability of its transmission line has limited choices. In devices such as the Xerox DocuCentre 240/265, the user must specify the correct configuration. Until this information is specified, the machine will not complete the power on process. There is no indicator under current practice to inform the operator whether the fault message is due to a disconnected transmission line or whether the fault message is simply because the line is busy sending or receiving messages from another device. In the absence of such indicator, the operator will often want to ensure that the fault is not from a defect in the transmission line itself. Since the presence or absence of a physical connection is one of the few problems that can be visibly diagnosed by an operator, many operators will respond to the fault message by attempting to inspect the connection between the system device and its transmission line. As noted above, this is wasted effort in many cases since the most common cause of the error message is simply that the transmission line is busy. Moreover, the receptacle for receiving the transmission line is usually in or near the rear of the system devices. If the operator moves the system device to inspect the physical connection to the transmission line in its rear, then the movement itself may result in a bad connection between the transmission line and the receptacle. In the case of large system devices such as production size copiers or printers, the very size of the system device makes movement difficult. An operator would greatly benefit from knowing for sure that the physical connection between the line and the receptacle is secure in order to be able to rule out this possibility without needing to attempt to move or awkwardly to peer behind such a large system device. Even for physically manageable devices, it would be beneficial for most operators to know that the connection between the transmission line and the receptacle is secure in order that this possible cause of a fault message be ruled out. With such increased information, an operator can more efficiently focus attention on other possible causes of the fault message or may conclude that the fault message is most likely the result of a line being in use when contacted by the system device.

In accordance with the present invention, there is provided an apparatus for connecting a transmission line that terminates with a connector to a device. The apparatus comprises a receptacle for receiving the connector and a sensor associated with the receptacle for detecting the presence of the connector within the receptacle.

Pursuant to another aspect of the present invention, there is provided a printing machine capable of communicating through a transmission line that terminates with a connector, such printing machine comprising a receptacle for receiving the connector; a sensor associated with the receptacle for detecting the presence of the connector within the receptacle; and a sensor circuit, communicating with the detecting sensor, for transmitting a signal indicating whether the detecting sensor detects the presence of the connector.

Pursuant to another aspect of the present invention, there is provided a method for of communicating through a transmission line that terminates with a connector, adapted to be received in a, such method comprising determining whether the connector is present within the receptacle; and determining whether a signal is being communicated through the transmission line.

BRIEF DESCRIPTION OF THE DRAWINGS

Other aspects of the present invention will become apparent as the following description proceeds and upon reference to the drawings, in which.

DETAILED DESCRIPTION

While the present invention will hereinafter be described in connection with its preferred embodiments and method of use, it will be understood that it is not intended to limit the invention to these embodiments and method of use. On the contrary, the following description is intended to cover all alternatives, modifications, and equivalents, as may be included within the spirit and scope of the invention as defined by the appended claims.

As an exemplary application of the present invention, application of the invention within an electrophotographic print engine will herein be described. In as much as the art of electrophotographic printing is well known, the various process stations employed in the FIG. 6 printing machine will be shown hereinafter schematically, and their operation described briefly with reference thereto.

Figure 6:
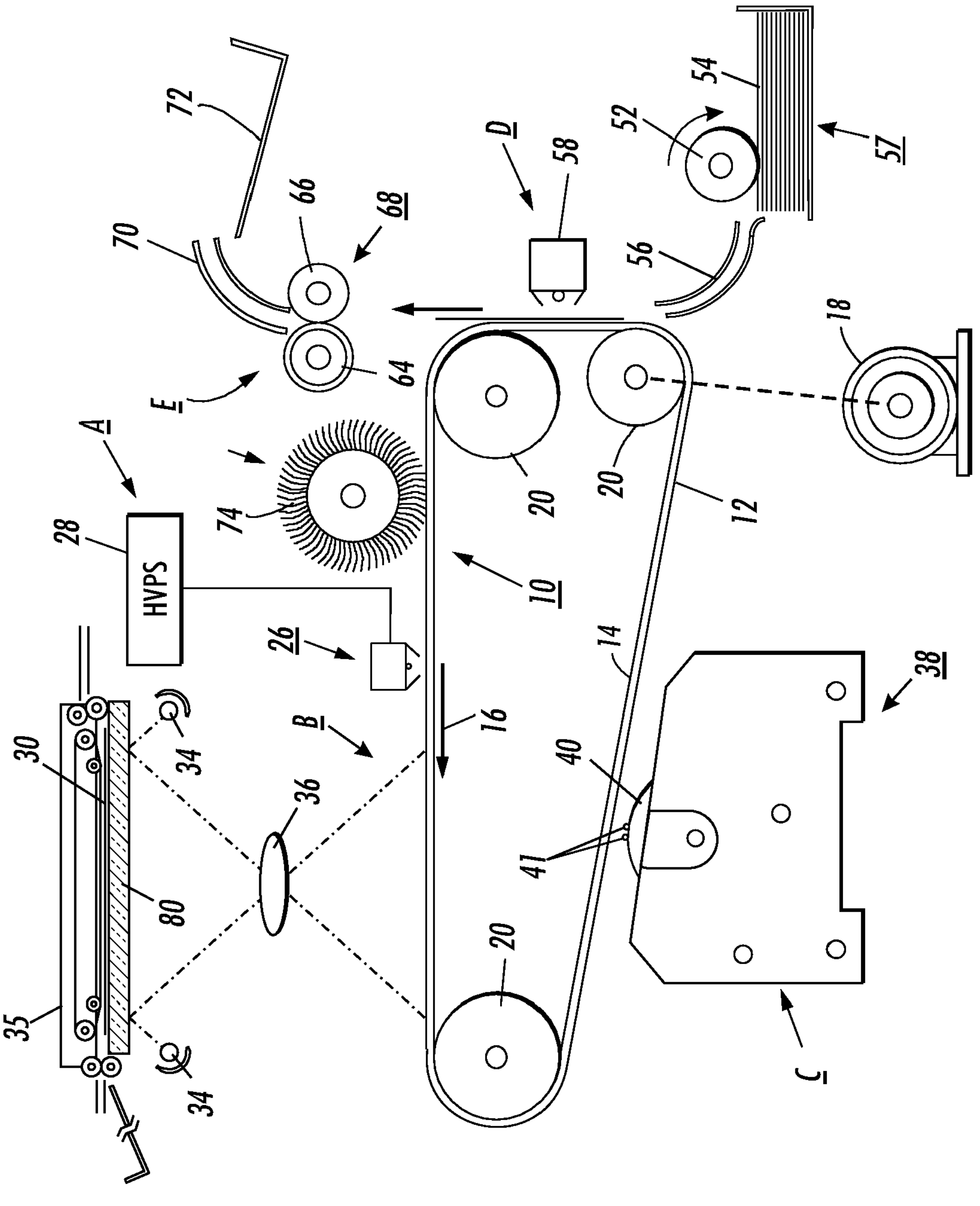
FIG. 6 is a schematic elevational view of an exemplary electrophotographic printing machine incorporating the connection sensing apparatus of the present invention.

Referring initially to FIG. 6, there is shown an illustrative electrophotographic printing machine incorporating the apparatus of the present invention therein. The printing machine incorporates a photoreceptor 10 in the form of a belt having a photoconductive surface layer 12 on an electroconductive substrate 14. Preferably the surface 12 is made from a selenium alloy. The substrate 14 is preferably made from an aluminum alloy which is electrically grounded. The belt is driven by means of motor 24 along a path defined by rollers 18, 20 and 22, the direction of movement being counterclockwise as viewed and as shown by arrow 16. Initially a portion of the belt 10 passes through a charge station A at which a corona generator 26 charges surface 12 to a relatively high, substantially uniform, potential. A high voltage power supply 28 is coupled to device 26. After charging, the charged area of surface 12 is passed to exposure station B. At exposure station B, an original document 30 is placed face down upon a transparent platen 32. Placement of original document 30 may be accomplished in some systems using an automatic document handling system 35 which, as explained below in more detail, may utilize the present invention. Lamps 34 flash light rays onto original document 30. The light rays reflected from original document 30 are transmitted through lens 36 to form a light image thereof. Lens 36 focuses this light image onto the charged portion of photoconductive surface 12 to selectively dissipate the charge thereon. This records an electrostatic latent image on photoconductive surface 12 which corresponds to the informational areas contained within original document 30. After the electrostatic latent image has been recorded on photoconductive surface 12, belt 10 advances the latent image to development station C. At development station C, a development system, develops the latent image recorded on the photoconductive surface. Preferably, development system includes a donor roller 40 and electrode wires positioned in the gap between the donor roll and photoconductive belt. Electrode wires 41 are electrically biased relative to donor roll 40 to detach toner therefrom so as to form a toner powder cloud in the gap between the donor roll and photoconductive surface. The latent image attracts toner particles from the toner powder cloud forming a toner powder image thereon. Donor roll 40 is mounted, at least partially, in the chamber of developer housing 38. The chamber in developer housing 38 stores a supply of developer material. The developer material is a two component developer material of at least magnetic carrier granules having toner particles adhering triboelectrically thereto. A transport roller disposed interiorly of the chamber of housing 38 conveys the developer material to the donor roller. The transport roller is electrically biased relative to the donor roller so that the toner particles are attracted from the transport roller to the donor roller. After the electrostatic latent image has been developed, belt 10 advances the developed image to transfer station D, at which a copy substrate 54 is advanced from substrate tray 57 by roll 52 and guides 56 into contact with the developed image on belt 10. A corona generator 58 is used to spray ions on to the back of the substrate so as to attract the toner image from belt 10 to the substrate. Contact between the copy substrate 54 and belt 10 is enhanced by transfer assist apparatus 50. As the belt 10 turns around roller 18, the copy substrate 54 is stripped therefrom with the toner image thereon. After transfer, the copy substrate is advanced by a conveyor (not shown) to fusing station E. Fusing station E includes a heated fuser roller 64 and a back-up roller 66. The substrate passes between fuser roller 64 and back-up roller 66 with the toner powder image contacting fuser roller 64. In this way, the toner powder image is permanently affixed to the substrate. After fusing, the substrate advances through chute 70 to catch tray 72 for subsequent removal from the printing machine by the operator. After the substrate is separated from photoconductive surface 12 of belt 10, the residual toner particles adhering to photoconductive surface 12 are removed therefrom by a rotatably mounted fibrous brush 74 in contact with photoconductive surface 12. Subsequent to cleaning, a discharge lamp (not shown) floods photoconductive surface 12 with light to dissipate any residual electrostatic charge remaining thereon prior to the charging thereof for the next successive imaging cycle.

Figure 1:
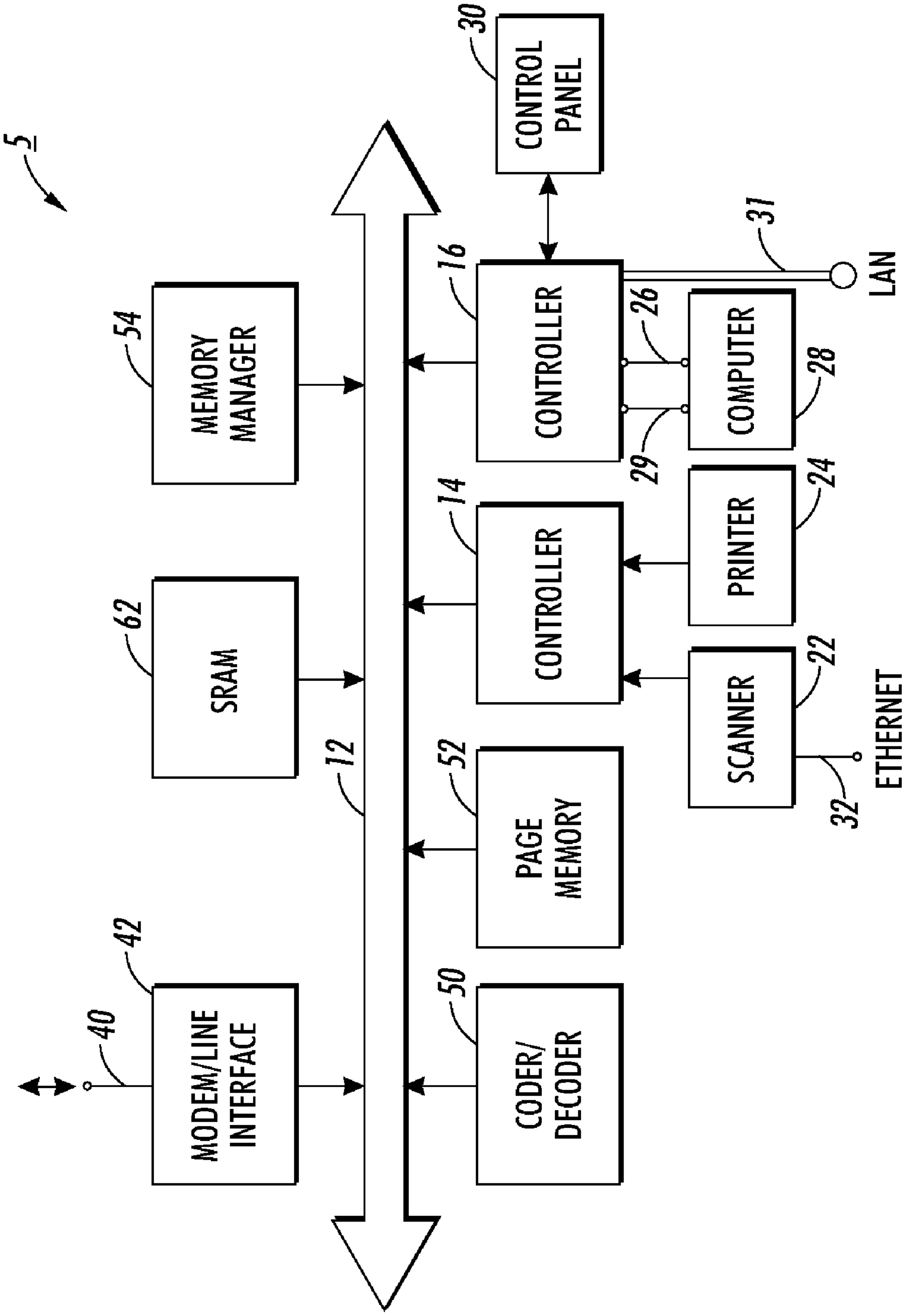
FIG. 1 is a block diagram of a typical multifunctional reprographic processing system.

Referring now to FIG. 1, a multifunctional document processing system 5 is shown schematically. Printer 24 of system 5 may be based upon the print engine described above in relation to FIG. 6 or may comprise any other electrophotographic, ink jet or other image forming apparatus. A system bus 12 provides for communication between components. Device control is distributed between two programmable controllers, hereinafter first controller 14 and second controller 16. Scanner 22 and printer 24 are connected to the system via first processor 14. The printer 24 generates whatever hard copy is required. Scanner 22 is included to provide full facsimile and/or copier functions. Scanner 22 may have its own connection to an outside PC or network as shown by Ethernet connection 32. More generally, the system is designed to process electronic document signals directed thereto via second controller 16 by serial, parallel or SCSI connection 26 from an external personal computer or workstation 28. Second processor 16 may support an additional outward connection 29 from the system to the personal computer 28 for passing scanned data thereto. A direct connection 31 from a local area network server to second controller 16 may be provided. Second controller 16 additionally provides control for a user interface/control panel (UI) 30 for the system. Second controller 16 also receives the outputs of the system's machine sensors, and provides control of the mechanical components of the system, particularly the paper transport systems. It will no doubt be appreciated that instead of or in addition to a personal computer, a network connection or network server could be substituted, to provide network operation.

Facsimile communication is provided for system 5 via a telephone line 40 and fax modem 42. Decoding and encoding of facsimile transmissions is provided by coder/decoder 50.

Page memory 52 is provided, having storage capability for storing electronic document signals corresponding to at least several pages. Conveniently, it is DRAM-type memory. Access to the memory is controlled by memory manager 54, which in turn is controlled by controller 16.

One embodiment of the invention allows the use of controller 16 to control access to a data bus 12, on which image information and control information flow. In such an arrangement, a facsimile transmission can be received by the document process system 5 at telephone line 40 and fax modem 42, and directed either directly to printer 24, via first controller 14, or to page memory 52. Information stored at page memory 52 can be directed to printer 24. Information from computer 28 or from network line 31 can be directed via, respectively, connections 26 or 31, through second controller 16, to either page memory 52 or printer 24. Scanned data from scanner 22 can be directed via first controller 14 either to page memory 52 or to printer 24.

It is believed that the foregoing description is sufficient for purposes of the present application to illustrate the general operation of a multifunction printing system incorporating the receptacle connector sensor of the present invention therein. Although the apparatus of the present invention is particularly well adapted for use in conjunction with an electrophotographic reproducing system of the type shown in FIG. 6, it will become apparent from the following discussion that the receptacle sensor of the present invention is equally well suited for use in any of a wide variety of electronic devices that communicate through a transmission line to a network or to a remote data source. In addition to reprographic systems, the present invention may be applicable to, without limitation, facsimile machines, computers and computer networks, telephone hubs, Internet devices, and data storage equipment.

Figure 2A:
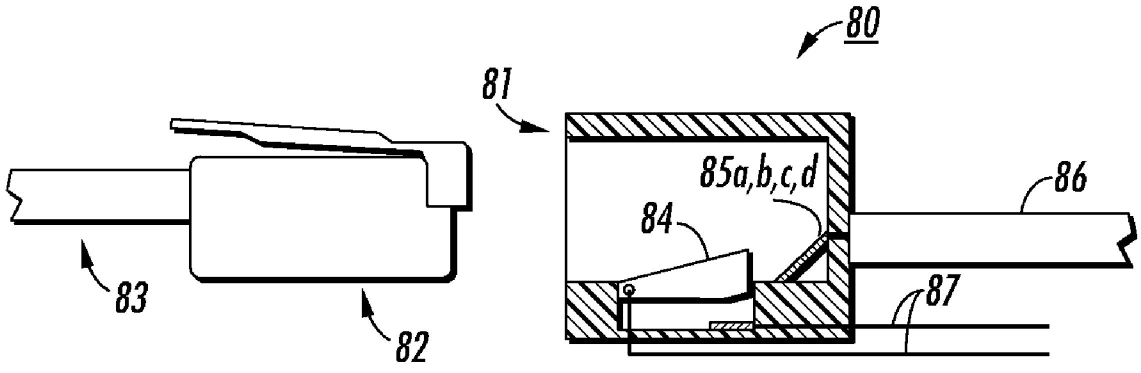
FIG. 2 is an elevational side view of a first embodiment of the present invention showing a pressure switch sensor within a plug receptacle.

Moving now to the particular features of the physical connection sensor of the present invention, reference is made to FIG. 2 wherein a first embodiment of the present invention is shown. In FIG. 2*a*, receptacle assembly 80 is shown comprising female receptacle 81 shaped to receive plug 82. In the back of receptacle 81 are contacts 85*a, b, c*, and *d* which are leads connecting to separate wires within receptacle line 86. In similar fashion, Plug 82 carries contacts for separate wires within plug line 83. Plug line 83 exits the system and connects to the external communication network. Although the current embodiment is shown using lines, plugs, and receptacles based upon components of a copper wire telephone system, those familiar with the art will readily understand that the present invention is equally applicable to any type of transmission line requiring a physical connection between a device and an external transmission line. Examples of lines include, without limitation, optical fibers, co-axial cables, USB lines, Ethernet lines, and similar electrical, optical, and pressure-transmitting transmission lines. Referring again to FIG. 1, each of transmission lines 26, 29, 31, 32, and 40 may benefit from use of the present invention.

Referring again to FIG. 2*a*, mounted within receptacle 81 is pressure switch 84. In FIG. 2*a*, pressure switch 84 is in its open position, and no current flows in the sensor circuit 87 connected through the switch. The absence of such current signals to the system controller (not shown) that no physical connection has been made between line 83 and receptacle line 86.

Figure 2B:
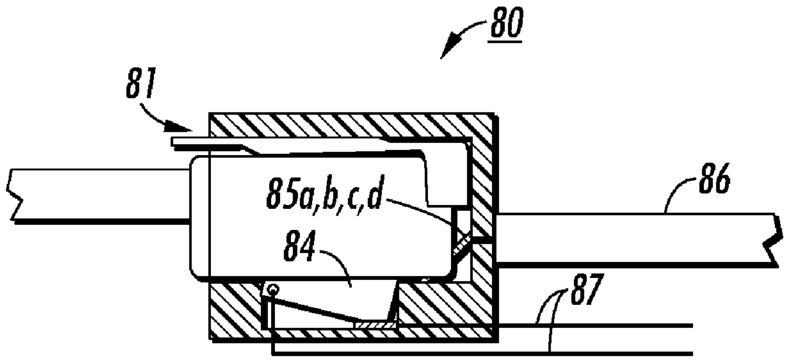

FIG. 2*b* shows the receptacle assembly of FIG. 2*a* after plug 82 has been inserted into receptacle 81. Insertion of plug 82 has pressed pressure switch 84 into its closed position, and current flows within the sensor circuit 87 signal to the controller (not shown) that a physical connection has been made between plug line 83 and receptacle line 86.

Figure 3A:
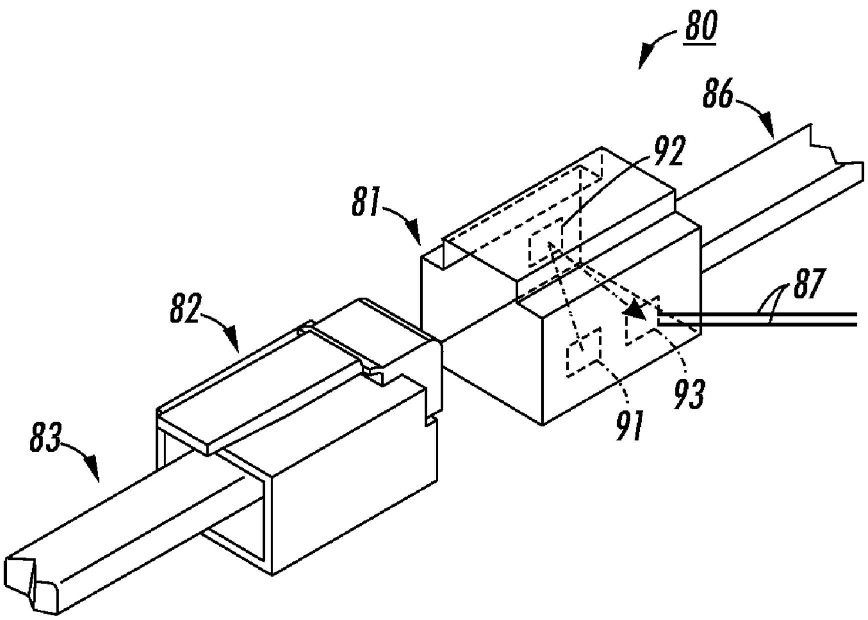
FIG. 3 is an elevational perspective view of a second embodiment of the present invention showing an optical sensor within a plug receptacle.
Figure 3B:
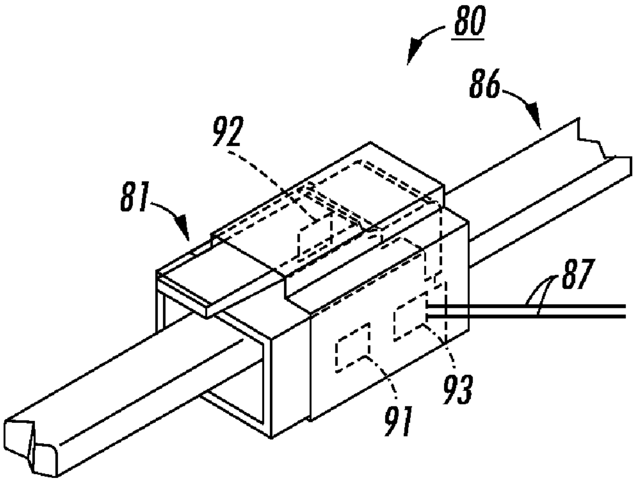

FIGS. 3*a* and 3*b* show an alternate embodiment of the present invention wherein the pressure switch 84 of FIGS. 2*a* and 2*b* is replaced by light emitting diode 91, mirror 92, and light sensor 93. Light emitting diode 91 emits light. When plug 82 is not in receptacle 81, the light is reflected from mirror 92 toward light sensor 93. A positive response at sensor 93 indicates that plug 82 is not present in receptacle 81. In contrast, a failure of light sensor 93 to detect reflected light indicates that plug 82 is present in receptacle 81.

Figure 4:
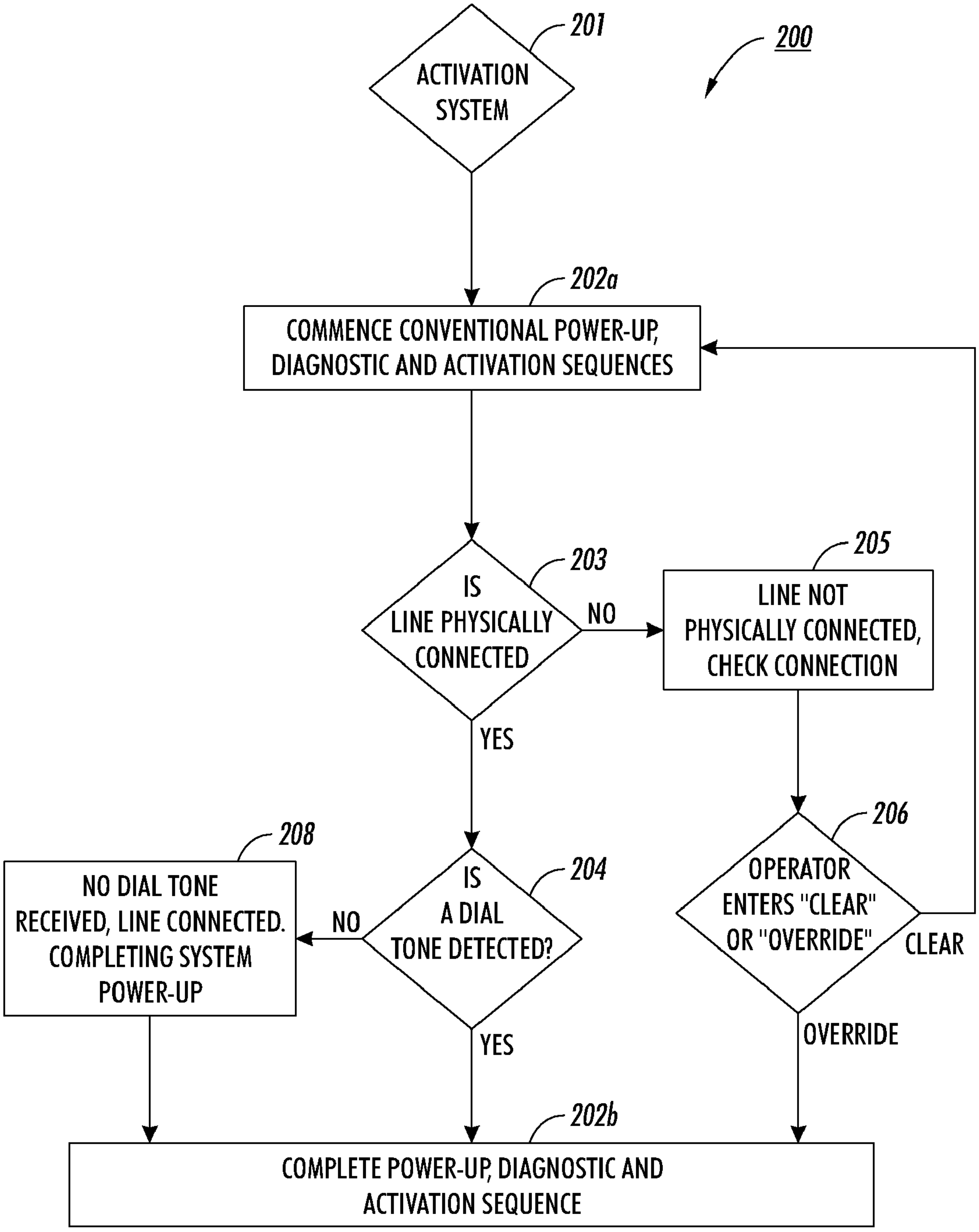
FIG. 4 is a flow chart of a first method of the present invention showing a logic sequence commencing upon system power up.

FIG. 4 shows one embodiment of system logic architecture that makes use of the sensor signal generated as shown in FIGS. 2 and 3. Specifically, FIG. 4 shows a method of using the sensor data during system power-up and activation. This power-up and activation sequence is shown generally as sequence 200 which is initiated at step 201. Sequence 200 is generally directed and interpreted by the system controller shown as 16 in FIG. 1. Within the power-up and activation sequence 200 there are diagnostic and power sequences 202*a* and 202*b*, both of which represent power-up, diagnostic, and activation sequences that are conventional and well known in the art. After completion of the first portion, shown as 202*a*, of this power-up and activation sequence, the sequences of the present invention are instituted. Step 203 initiates the sequences of the present invention by inquiring whether switch circuit 87 as shown in FIGS. 2 and 3 detects a physical connection between the plug 83 and receptacle 81. Assuming that an affirmative response is received, then step 204 inquires whether a dial tone has been detected. Assuming an affirmative response to the inquiry of step 204, then the second portion, 202*b*, of the conventional power-up and activation sequence continues.

In the event that a negative response is received to the inquiry of step 203, then the following Default Message as shown in Box 205 is displayed for the operator on control panel 30 of FIG. 1:

<No line connection detected. Check line connection.>

The system as shown in FIG. 4 is configured to halt its power-up and activation sequence 200 if a physical connection between plug 83 and receptacle 81 is not detected. Such a configuration may be selected where the failed physical connection involves a transmission line essential to a significant function of the device, e.g., a telephone line for a facsimile machine or a multifunctional machine having fax capability and frequent use as a facsimile machine. Such a configuration may also be selected where remote data transfer over the applicable transmission line is an important component of system maintenance and for frequent software updates. As shown in FIG. 4, the Default Message of Box 205 is displayed on the system console 30 (shown in FIG. 1), thereby indicating to the operator that there is a problem with the connection to transmission line 83. System power-up and activation will not proceed until the operator intervenes as provided in step 206. At step 206, the operator may enter <CLEAR> in which case step 202*a* is restarted. This command from the operator presumably occurs after the operator has reconnected plug 82 into receptacle 81. Alternatively, the operator can override the Fault Message of Box 205 by directing that the power-up and activation sequence of step 202*b* be completed without further attempts to monitor switch circuit 87 to detect a physical connection between plug 82 and receptacle 81.

In the event that a positive response is received to step 203 but a negative response is received to the inquiry of step 204, then the configuration shown in FIG. 4 continues with power-up and activation sequences 202*b* but displays the <No Dial Tone> message shown in Box 208 on the system console 30 (shown in FIG. 1). This configuration may be selected where a failed connection to the transmission line 83 is not an important priority for most users of the system or where the lack of a dial tone is most likely due to a temporary condition such as use of transmission line 83 by alternate users or devices connected to the same transmission line.

Figure 5:
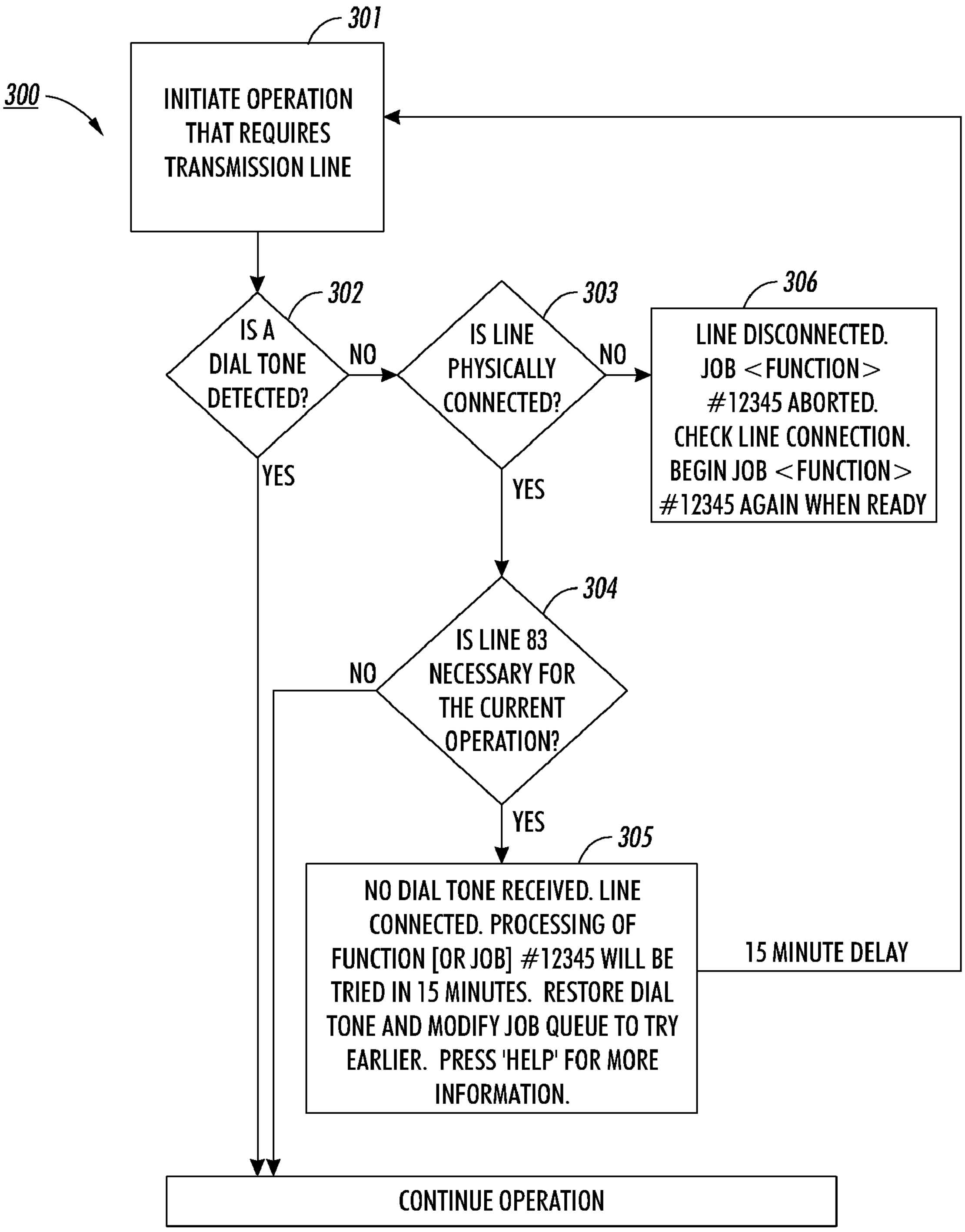
FIG. 5 is a flow chart of a second method of the present invention showing a logic sequence commencing at an event other than system power up.

Turning now to FIG. 5, an alternate embodiment 300 of the method of the present invention is shown. This embodiment is initiated at step 301 wherein the controller 16 of FIG. 1 commences an operation that requires use of transmission line 83. Step 301 may be initiated automatically on a timed basis to ensure that the system is available for sending or receiving remote data transfers. Step 301 may also be initiated as part of an activation sequence of a subsystem that will attempt to communicate through transmission line 83. For example, for systems where active communication through transmission line 83 is important for the functions of the system, then step 301 may be an operation that is initiated every hour or at some other scheduled time interval that is deemed appropriate for the frequency and importance of the communication link. Step 301 could also be incorporated into the activation sequence of an operation which is a job to be performed by the device such as activation of the facsimile subsystem of a multifunctional system. In a multifunctional system, operations, including jobs, similar to the above may be arranged in a queue that sets forth the relative priorities and expected order of processing.

Once sequence 300 is initiated pursuant to step 301, controller 16 inquires, at step 302, whether a dial tone or similar signal of line availability is detected. An affirmative response to the inquiry of step 302 results in an assumption that a communication link through line 83 is available. The operation that initiated step 301 is then continued. In the event that a negative response is received to the inquiry of step 302, then controller 16 issues the inquiry of step 303 which asks whether a physical connection between plug 83 and receptacle 81 can be detected. If sensor circuit 87 of FIGS. 2 and 3 confirms the existence of a physical connection, then the controller issues the inquiry of step 304 which asks whether the communication link through line 83 is needed to process the operation currently being performed. For instance, a remote data transfer operation for routine maintenance status checks would require the availability of transmission line 83 as would an attempt to send a facsimile job. An operation initiated on a timed basis simply to determine whether line 83 is available to receive remote data transfers or facsimiles would not require immediate availability of transmission line 83. If the answer to step 304 is affirmative, i.e., that the current operation requires use of transmission line 83, then controller 16 interrupts the processing of the current operation and directs that the following message shown in Box 305 is displayed on the device control panel:

> No Dial Tone Received. Line Connected. Processing of function <job> #12345 will be tried again in 15 minutes. Restore dial tone and modify job queue to try earlier. Press HELP for more information.

It is contemplated in the above example that the system will maintain a job queue similar to that taught In U.S. Pat. No. 4,947,345, issued to Paradise et al., and that each operation, including jobs, will be identified in the queue by an alphanumeric ticket number such as #12345 shown above. It is also contemplated that the HELP command will provide instructions concerning probable methods of restoring a dial tone, such as interrupting use of line 83 by other devices that may be currently using line 83. It is also contemplated that the HELP command will provide instructions for finding and modifying the order of jobs or operations in the queue. As used in the message above, "job" means a service operation to be performed by the system whereas a "function" means an operation internally generated by the device or system such as using remote data transfer for software updates and maintenance.

If the query of box 304 is answered negatively, i.e., the operation currently being performed does not require communication through line 83, then the system continues to process jobs in its queue. It is contemplated that this situation arises when step 301 was an initiation of the sequence based on a timed interval or was initiated upon some other routine basis not connected to processing of a particular operation that is otherwise in the system queue.

Returning to step 303, if sensor circuit 87 signals the absence of a physical connection between plug 82 and receptacle 81, then the following message as shown in Box 306 is displayed on the device control panel:

> Line disconnected. Job <function> #12345 aborted. Check line connection. Reconnect line. Begin job #12345 again.

When the query of step 303 is answered negatively, the operation currently being processed is removed from the queue and will be reentered into the queue only in response to actions by the operator.

Although the sequences of FIGS. 4 and 5 are shown in reference to a transmission line such as a telephone line which emits a dial tone signifying its availability, those familiar with the art will appreciate that the examples describe any transmission line that can emit a signal that indicates its availability.

In review, the connection sensor apparatus and method of the present invention include a sensor for detecting the presence of a physical connection between a transmission line and the communications receptacle of a device. When compared to systems in the prior art that determine the availability of the transmission line by detecting a dial tone or similar signal, the present invention permits an operator to more readily determine if the failure of a communications connection is due requires his or her intervention to inspect the transmission line or whether the unavailability of the transmission line is more likely due to its current use by other devices attempting to use the same line. The present invention also enables a more sophisticated method of interrupting, delaying, or rearranging the order in which a system such as a multifunctional system performs its operations.

It is, therefore, evident that there has been provided in accordance with the present invention a physical transmission line sensor and method of use that fully satisfies the aims and advantages set forth above. While the invention has been described in conjunction with several embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method of communicating through a transmission line that terminates with a connector, adapted to be received in a receptacle, comprising:

urging a connector inward a receptacle and into physical contact with a sensor switch situated in the receptacle;

urging the sensor switch in the receptacle into physical contact with and completing a sensor circuit connected through the sensor switch by continuing an inward push of the connector; and, urging the connector into physical contact with a receptacle line situated in the receptacle;

wherein a cause of an unavailable connection is identified as a failure of a transmission line connector when the sensor switch is not in physical contact with the sensor circuit and identified as a failure by a simultaneous use of other associated devices when the sensor switch is in the physical contact with the sensor circuit.

2. The method of claim 1, further including:

determining whether the connector is present within the receptacle by means of a resistance reading made between the sensor within the receptacle and the sensor circuit;

determining whether a signal is being communicated through the transmission line;

wherein the step of determining whether the connector is present within the receptacle occurs before the step of determining whether a signal is being communicated through the transmission line.

3. The method of claim 2, further comprising the step of initiating activation of a device prior to the step of determining whether the connection is present within the receptacle.

4. The method of claim 2, further comprising, in response to determining that the connector is not present within the receptacle, requiring an operator to intervene in order for further operations to occur.

5. The method of claim 2, further comprising, in response to determining that a signal is not being communicated through the transmission line, placing a device in a condition that is ready to perform further operations.

6. The method of claim 2, wherein the step of determining whether a signal is being communicated through the transmission line occurs before determining whether the connector is present within the receptacle.

7. The method of claim 6, wherein, in response to determining that a signal is not being communicated through the transmission line, determining whether the connector is present within the receptacle.

8. The method of claim 6 further comprising the step of initiating the step of determining whether a signal is being communicated through the transmission line at times other than at an activation of a device.

9. The method of claim 6, further comprising, in response to determining that the connector is present within the receptacle, delaying processing of an operation currently being performed by the device when the current operation requires use of the transmission line.

10. The method of claim 6, further comprising, in response to determining that a plug connector is not present within the receptacle, aborting processing of an operation currently being performed by the device when such operation requires use of the transmission line.

11. A method of operating a communications transmission line, that terminates with a connector adapted to be received in a receptacle, comprising:

providing an inner surface of the receptacle with a sensor for detecting a presence of the connector;

urging the connector inward the receptacle and into physical contact with the sensor;

urging movement of the sensor by the connector into contact with a circuit connected through the sensor, the movement of the sensor completing the circuit;

urging the connector into contact with the a transmission line situated in the receptacle;

determining via the connector's physical contact with the sensor whether the connector is present within the receptacle; and determining whether a signal is being communicated through the transmission line, wherein no signal being communicated indicates a failure of transmission caused by simultaneous use of other devices.

12. The method of claim 11, wherein the step of determining whether the connector is present within the receptacle occurs before the step of determining whether a signal is being communicated through the transmission line.

13. The method of claim 12, further comprising the step of initiating activation of a device prior to the step of determining whether the connection is present within the receptacle.

14. The method of claim 12, further comprising, in response to determining that the connector is not present within the receptacle, requiring an operator to intervene in order for further operations to occur.

15. The method of claim 12, further comprising, in response to determining that a signal is not being communicated through the transmission line, placing a device in a condition that is ready to perform further operations.

16. The method of claim 11, wherein the step of determining whether a signal is being communicated through the transmission line occurs before determining whether the connector is present within the receptacle.

17. The method of claim 16, wherein, in response to determining that a signal is not being communicated through the transmission line, determining whether the connector is present within the receptacle.

18. The method of claim 16 further comprising the step of initiating the step of determining whether a signal is being communicated through the transmission line at times other than during an activation sequence of a device.

19. The method of claim 16, further comprising, in response to determining that the connector is present within the receptacle, delaying processing of an operation currently being performed by the device when the current operation requires use of the transmission line.

20. The method of claim 16, further comprising, in response to determining that a plug connector is not present within the receptacle, aborting processing of an operation currently being performed by the device when such operation requires use of the transmission line.

21. A method of operating a device provided with a communications transmission line, where that communications transmission line terminates with a connector adapted to be received in a receptacle, the receptacle provided by the device comprising:

providing an inner surface of the receptacle with a moveable sensor switch for detecting a presence of the connector;

moving the connector into the receptacle;

moving the sensor switch from a first position to a second position, the second position in contact with a sensor circuit connected through the sensor, the movement of the sensor completing to complete the circuit;

moving the connector into contact with the transmission line situated in the receptacle;

activating the device;

determining via the connector's physical contact with the sensor whether the connector is present within the receptacle; and after determining the connector is in positive contact with the sensor, determining whether a signal is being communicated through the transmission line, wherein no signal being communicated indicates that a failure of transmission is caused by simultaneous use of other associated devices and not by failure of the connector to contact the transmission line.

22. The method of claim 21, wherein the step of determining whether the connector is present within the receptacle occurs before the step of determining whether a signal is being communicated through the transmission line.

23. The method of claim 22, further comprising, in response to determining that the connector is not present within the receptacle, requiring an operator to intervene in order for further operations to occur.

24. The method of claim 22, further comprising, in response to determining that a signal is not being communicated through the transmission line, placing a device in a condition that is ready to perform further operations.

25. The method of claim 21, wherein the step of determining whether a signal is being communicated through the transmission line occurs before determining whether the connector is present within the receptacle.

26. The method of claim 25, wherein, in response to determining that a signal is not being communicated through the transmission line, determining whether the connector is present within the receptacle.

27. The method of claim 25 further comprising the step of initiating the step of determining whether a signal is being communicated through the transmission line at times other than during the activation sequence of a device.

28. The method of claim 25, further comprising, in response to determining that the connector is present within the receptacle, delaying processing of an operation currently being performed by the device when the current operation requires use of the transmission line.

29. The method of claim 25, further comprising, in response to determining that a plug connector is not present within the receptacle, aborting processing of an operation currently being performed by the device when such operation requires use of the transmission line.

* * * * *